United States Patent [19]

Mikovsky et al.

[11] 3,959,179

[45] May 25, 1976

[54] DESULFURIZATION CATALYSTS

[75] Inventors: Richard J. Mikovsky, Trenton, N.J.;
Anthony J. Silvestri, Morrisville, Pa.

[73] Assignee: Mobil Oil Corporation, New York, N.Y.

[22] Filed: Sept. 23, 1974

[21] Appl. No.: 504,467

[52] U.S. Cl. ............................ 252/455 Z; 252/458; 252/459; 252/465; 252/466 J; 423/630
[51] Int. Cl.² .................... B01J 29/06; B01J 23/16; C01F 7/02
[58] Field of Search ............... 252/455 Z, 458, 465, 252/466 J, 459; 423/629, 630; 208/216, 217

[56] References Cited
UNITED STATES PATENTS

| | | | |
|---|---|---|---|
| 3,419,352 | 12/1968 | Acciarri | 423/630 |
| 3,663,176 | 5/1972 | Cagle et al. | 252/458 |
| 3,755,205 | 8/1973 | Duncan et al. | 252/458 |
| 3,789,025 | 1/1974 | Tauster | 252/465 |
| 3,862,104 | 1/1975 | Witt | 252/458 |
| 3,898,322 | 8/1975 | Leach | 423/630 |
| 3,907,982 | 9/1975 | Leach | 423/630 |
| B302,998 | 1/1975 | Young | 252/455 Z |

*Primary Examiner*—G. J. Crasanakis
*Attorney, Agent, or Firm*—Charles A. Huggett; Raymond W. Barclay; Stanley A. Strober

[57] ABSTRACT

Catalysts capable of desulfurizing organo-sulfur compounds particularly those normally found in petroleum compositions, such as thiophene, are prepared from metal-containing compounds of metals of Groups VIB and VIII of the Periodic Table on a refractory support or base. Of particular interest are catalysts containing components of cobalt and molybdenum oxides on alumina which preparation utilizes dimethyl sulfoxide (DMSO). The use of such catalysts provides increase of conversion rate-constants of desulfurization reactions. A process of treating the base and the base material obtained from such process are also disclosed herein.

15 Claims, No Drawings

DESULFURIZATION CATALYSTS

BACKGROUND OF THE INVENTION

1. Field of the Invention

This invention relates to novel desulfurization catalysts and to a method of utilizing the same.

2. Description of the Prior Art

U.S. Pat. No. 3,528,768 discloses the preparation of cation-exchanged crystalline aluminosilicates in which the cation is a transition metal, such as platinum, molybdenum and chromium. The procedure involves mixing the aluminosilicate with DMSO or other solvent and then adding a solution of a metal compound in DMSO to the zeolite DMSO mixture, removing the DMSO, and washing, drying and calcining the resulting solids.

The following references disclose the use of cobalt or molybdenum compounds or both on alumina in desulfurization: U.S. Pat. Nos. 2,577,823; 2,737,471; 2,761,816-7; 2,837,465; 2,886,750; 2,880,171; 2,894,903; 2,905,636; 3,000,816; 3,075,915 and 3,712,861. A number of these references disclose the technique of either presulfurizing the catalyst prior to desulfurization or including a specific sulfur compound in the feedstock to carry out in situ sulfiding or the use of metal sulfides themselves in preparing the catalyst. Usually the catalysts are prepared by aqueous impregnation followed by drying and calcining.

SUMMARY OF THE INVENTION

It has now been discovered that effective desulfurization catalysts may be prepared by impregnating a refractory base with at least one metal-containing compound in a non-aqueous polar solvent in which the metal is either from Groups VIB or VIII of the Periodic Table or both. A novel process of catalytic desulfurization of sulfur-bearing hydrocarbons using these catalysts has also been discovered. A novel treatment of the said base with the non-aqueous polar solvent as the treating agent and novel base materials produced by such treatment are further discoveries of this invention.

DESCRIPTION OF SPECIFIC EMBODIMENTS

The catalysts of this invention consist of a refractory base as the carrier and a single metal-containing component or a mixture of two or more metal-containing components incorporated therewith.

The suitable refractory materials of this invention include the oxides of metals or non-metals, such as silicon, aluminum, zirconium, magnesium, chromium, germanium, vanadium, and the like elements from Groups IIA, IIIA, IVA and B, VB, VIB, VIIB and VIII of the Periodic Table. Also mixtures of these oxides such as silica and alumina, aluminosilicates, such as zeolites, silica-zirconia, alumina-zirconia, and the like may be used. The most preferred carrier is alumina, including both eta alumina and gamma alumina.

The metal-containing components to be combined with the base are of Groups VIB and VIII of the Periodic Table. Concentrations of from 0.1% to about 50%, preferably 0.5% to 35%, by weight of each metal component may be used. Suitable metal-containing components include the oxides of chromium, molybdenum, tungsten, cobalt, nickel, palladium, platinum, rhodium, ruthenium and the like. The catalyst may consist of only a single metal-containing component or a combination thereof either from the same periodic group or from different groups. It is preferred that two metal-containing components from two different periodic groups be used. Thus, at least one of the metals, if a mixture is used, should be from Group VIB. The preferred catalyst of this invention contains one metal-containing component of chromium, molybdenum or tungsten and one metal-containing component of iron, cobalt or nickel. The use of expensive noble metals in carrying out catalytic desulfurization is considered uneconomical because of reason of cost. Accordingly, the most preferred catalyst of this invention contains molybdenum and cobalt. Molybdenum-containing catalysts have excellent activity for the removal of sulfur from thiophene and tetrahydrothiophene and for the hydrogenation of butenes to butane. The cobalt-containing component alone provides a poor desulfurization-hydrogenation catalyst. However, when combined with molybdenum, it effects both sulfur removal and secondary hydrogenation to the alkane.

In the preparation of the catalyst the base material may be impregnated with a solution of a soluble compound of the first metal in a strong non-aqueous polar solvent. Dimethyl sulfoxide, also referred to herein as "DMSO", is the most preferred solvent. Other solvents include tetrahydrofuran, sulfolanes, cyanides and nitriles, such as alkyl cyanides and acrylonitrile, and lower alkyl amides, such as dimethyl formamide. Although the particular order is not critical, preferably the group VIB metal compound is applied first to the base in the non-aqueous solution. The resulting solids are dried and calcined. To these solids is then added a second solution of the second metal compound, preferably the Group VIII metal compound in non-aqueous solvent. The solids are dried and calcined. The resulting mixture from each impregnation is stirred for a period of time sufficient to obtain the desired contact between the metal compound and the base. The drying step is at a temperature from about 90° to about 150°C. Calcining is at temperatures of about 800° to about 1400°F. The soluble metal compounds used in this invention include ammonium molybdates, chromates and tungstates, cobaltous nitrate, nickel nitrate, formates, acetates and the like.

Variations of this procedure may provide increased activity in desulfurization. These variations may be described using DMSO, alumina, molybdenum and cobalt only for the purposes of illustration.

1. The base is impregnated with a solution of ammonium molybdate in DMSO, the solids are dried and calcined and mixed with a solution of cobaltous nitrate in DMSO, the solids being dried and calcined.

2. Same as (1) except the base is impregnated with hot solutions of the salts in DMSO.

3. The alumina base is refluxed in DMSO from 30 minutes to 24 hours then dried and calcined, followed by sequential impregnations with the two DMSO solutions.

4. The alumina base may be precipitated from aluminum chloride solution and washed, and the wet filter cake refluxed in DMSO at about 90°-150°C and then dried and calcined followed by sequential impregnations with the metal-containing DMSO solutions as in (3).

Without wishing to be limited to any particular theory of catalysis, it is believed that initial refluxing of the base in the non-aqueous solvent, particularly DMSO, may change the nature of the pores of the base in some manner. In variation (4), the alumina, precipitated as a wet cake and refluxed with DMSO, has a particle density about half that of alumina produced by aqueous precipitation and 4 times the percent of pores of over 100 Angstrom diameter. It is believed that a novel form of alumina has been produced by this procedure. Other metal oxides may be so produced by similar procedure. Moreover, catalysts prepared from this novel alumina base are active desulfurizing catalysts. Accordingly, novel metal oxides may be prepared by precipitating an insoluble metal compound, such as a metal hydroxide, from an aqueous solution of a soluble metal salt, such as the metal halide, filtering the same from solution, then refluxing the wet cake in the non-aqueous polar solvent and drying and calcining the solids.

The desirability of reducing the sulfur content from petroleum has increased in recent years in the interest of removing pollutants occasioned by the consumption of petroleum products, such as gasoline and heating oil. "Bound" sulfur compounds as used in this invention are those in which the sulfur is chemically combined in an organic molecule. It is known that in petroleum feed stocks thiophenic compounds, such as thiophene and tetrahydrothiophene, are present. Loosely bound sulfur compounds, such as organic sulfides, are more readily removed by various petroleum refining steps. More tightly bound sulfur compounds are not easily removed without catalytic or high temperature treatment. In order to evaluate the catalysts of this invention, desulfurization of thiophene, which represents the typical bound sulfur compound present in crude hydrocarbon stocks would demonstrate the relative activity of various catalysts. It is a heterocyclic compound and is a relatively stable material. The function of the catalyst is to break the cyclic bonds. This process is carried out in a hydrogen atmosphere and hence the formation of hydrogen sulfide occurs. The resulting intermediate organic product is a butene, which in the presence of hydrogen becomes saturated to butane.

The reaction conditions for the conversion of thiophene in accordance with this invention are temperatures in the range from about 400° to about 1000°F and preferably from 500° to 750°F, and total pressures of from about 50 to 1000 psig in the presence of hydrogen. The process of desulfurization in this invention may be carried out in a reaction vessel equipped with a catalyst zone wherein the catalyst is in a fixed bed. Hydrogen and thiophene are metered in at any desired pressure and the temperature is varied to obtain conversion rates. Product samples may be taken from a bleed stream to determine components in the product. The catalyst is preferably pretreated in the reactor by subjecting it to hydrogen sulfide at atmospheric pressure and an elevated temperature.

The relative first-order rate constants are all used as a measure of the activity rating of the catalysts of this invention.

The rate constant for the desulfurization of the thiophene to butene is considered to be a first-order rate constant and may be calculated from the following equation $$K_1 = 100(C_eT_eX_e)/C_rT_rX_r$$

wherein C is the concentration of catalyst, T is the temperature in degrees Kelvin, X is the natural logarithm of the mole (or) weight fraction of thiophene remaining after a given period of time, e refers to the experimental catalyst being studied and r refers to the comparison catalyst. Hence, a $K_1$ of 100 is the relative rate constant equal to that of the reference catalyst.

The following examples illustrate various aspects of carrying out the invention although the invention is not limited thereto. All references to percentages or parts are on a weight basis unless otherwise stated. It should be noted that the concentration of metal components in the catalyst are percentages equivalent to the metal oxides, however, the actual state of the metals is not precisely known.

EXAMPLE I

Control Catalyst By Aqueous Impregnation

In a suitable vessel, 5 grams of gamma alumina was mixed with an aqueous solution of 0.705 gram of $(NH_4)_6Mo_7O_{24}.4H_2O$ in 7 cc of water. The mixture was stirred at room temperature until the alumina was uniformly wet. The mixture was dried in an oven at 110°C for 1 hour and calcined in a muffle furnace at 1000°F for 2 hours. A solution of 0.670 gram of $Co(NO_3)_2.6H_2O$ in 7 cc of water was added to the calcined product until the product was uniformly wet. The solids were dried for 1 hour at 110°C. The dried solids were calcined in a muffle furnace at 1000°F for 2 hours. The catalysts so prepared contained about 3% by weight of CoO and 10% by weight of $MoO_3$.

EXAMPLE II

In a suitable vessel, 10 grams of the gamma alumina was mixed with a solution consisting of 1.41 grams of $(NH_4)_6Mo_7O_{24}.4H_2O$ in 13 cc of DMSO at room temperature until the solids were uniformly wet. The solids were dried and calcined as in Example I. A solution consisting of 1.34 grams of $Co(No_3)_2.6H_2O$ in 13 cc of DMSO was added at room temperature to the solids until the solids were uniformly wet. The mixture was dried and calcined as in Example 1. The final product contained the equivalent of 3% of CoO and 10% of $MoO_3$.

EXAMPLE III

The gamma alumina base (113 grams) was previously calcined and mixed with about 400 grams of DMSO in a roundbottom flask, equipped with a reflux condenser, and the mixture was refluxed at about 170°C for 2 hours. The solids were then filtered off and dried at 110°C for 2 hours and calcined at 1000°F for 2 hours. Following the procedure of Example II, a 5-gram aliquot of the resulting alumina was then mixed with a solution of 0.705 gram of $(NH_4)_6Mo_7O_{24}.4H_2O$ in 7 cc of DMSO until uniformly wet and the solids were dried and calcined as in Example 1. The resulting solids were mixed with 0.670 gram of $Co(NO_3)_2.6H_2O$ in 7 cc of DMSO until the solids were uniformly wet and again the wet solids were dried and calcined as in Example I. The final product contained the equivalent of 3% of CoO and 10% of $MoO_3$.

EXAMPLE IV

The gamma alumina base (65.5 grams) was mixed with 375 grams of DMSO and the mixture was refluxed at about 170°C for nineteen hours. The solids were then filtered off and dried at 110°C for 2 hours and calcined at 1000°F for 2 hours. Following the procedure of Example III, a 5-gram aliquot of the resulting alumina was then mixed with the same solutions of $(NH_4)_6Mo_7O_{24}.4H_2O$ and $Co(NO_3)_2.6H_2O$ in DMSO in the same amounts as used in Example III and the solids after each impregnation were dried and calcined as in Example I. The final product contained the equivalent of 3% of CoO and 10% of $MoO_3$.

EXAMPLE V

The gamma alumina base (5 grams) was mixed with a solution of 0.705 gram of $(NH_4)_6Mo_7O_{24}\cdot 4H_2O$ in 20 cc of DMSO, and the mixture was refluxed for 2 hours. The DMSO was evaporated at 110°C. The solids were calcined at 1000°F for 2 hours and a solution of 0.670 of $Co(NO_3)_2\cdot 6H_2O$ in 20 cc of DMSO was mixed with the solids. The mixture was heated on a hot plate with stirring to dryness. The resulting solids were further dried for 1 hour at 110°C and calcined at 1000°F for 2 hours. The final product contained the equivalent of 3% of CoO and 10% of $MoO_3$.

EXAMPLE VI

Alumina was prepared in the laboratory by dissolving 120.5 grams of $AlCl_3\cdot 6H_2O$ in 6 liters of water. The solution was neutralized to a pH of 9 to 10 with conc. $NH_4OH$, and the resulting aluminum hydroxide was precipitated from solution. The solids were filtered and washed with water and a 50% aliquot was dried in air at 110°C for 2 hours and calcined at 1000°F for 2 hours. To 5 grams of the resulting alumina were added 9 cc of DMSO solution containing 0.705 gram of $(NH_4)_6Mo_7O_{24}\cdot 4H_2O$ until the alumina was uniformly wet, and the mixture was dried and calcined as in Example 1. To the calcined product was added 8 cc of DMSO solution containing 0.670 of $Co(NO_3)_2\cdot 6H_2O$. The solids were dried and calcined as in Example 1. The resulting catalyst contained the equivalent of 3% CoO and 10% $MoO_3$.

EXAMPLE VII

A quarter of the remaining washed, wet filter cake prepared in Example VI was mixed with about 400 cc of DMSO and the mixture heated to reflux conditions at about 120°C for 2 hours. The solids were filtered out, dried at 110°C for 2 hours and calcined at 1000°F for 2 hours. The resulting alumina (5 grams) was impregnated in sequence with 10 cc of DMSO solution containing 0.705 of $(NH_4)_6Mo_7O_{24}\cdot 4H_2O$ and 10 cc of DMSO solution containing 0.670 of $Co(NO_3)_2\cdot 6H_2O$. The solids after each impregnation were dried and calcined as in Example I. The resulting solid product contained the equivalent of 3% CoO and 10% of $MoO_3$.

The alumina obtained after the DMSO reflux step in Example VII had a particle density of 0.71 gram/cc. and a pore volume of 1.089 cc/gram; the alumina of Example VI had a particle density of 1.28 and a pore volume of 0.457; surface area, 334 in²/gram for the Example VII alumina and 300 for the Example VI alumina. The pore diameter ranges, in percent for Examples VI and VII aluminas respectively were: 7-10A, 1.6 and 1.5; 10-15A, 10.6 and 4.5; 15-25A, 16.1 and 5.1; 25-50A, 35.9 and 12.9; 50-75A, 15.4 and 9.7; 75-100A, 6.2 and 7.2; 100-200A, 3.7 and 10.1; 200-300A, 1.1 and 6.6; over 300A, 9.3 and 42.4.

EVALUATION OF CATALYSTS

The apparatus and the procedure for carrying out the thiophene desulfurization are as follows:

Metered hydrogen and thiophene reactant from a positive displacement pump are charged to a reactor at a preestablished pressure determined by a Grove loader. The reactor has a total capacity of about 11 cc which can be partitioned between a preheating zone and the catalyst zone. The heating elements and the control thermocouple are wound onto the reactor with the appropriate insulation. The temperature of the catalyst zone is read by a sheathed thermocouple extending up through a "tee" at the bottom of the reactor. The total gas flow was metered by a soap-film flow meter downstream of the Grove loader. In practice, a bleed stream of about one-fifth of the total flow is established through the metering valve at the base of the reactor. Total product samples from this bleed stream are taken through a sampling septum for chromatographic analysis. The Grove loader and lines downstream of the reactor are heat traced to prevent condensation of reaction products and unconverted thiophene.

The conditions of the test are as follows:

Catalyst pretreatment — 90 min. in $H_2S$ flow at 800°–900°F at atmospheric pressure.
Catalyst volume — 0.3 cc of 50-60 mesh particles diluted with 3.0 cc of 50-60 mesh Vycor.
Temperatures — 550°, 600° and 650°F
Total Pressure — 400 psig
Thiophene rate — 5.14 cc/hr.; LHSV = 17.1
Hydrogen rate — 533 cc/min. under ambient conditions; Hydrogen/thiophene mole ratio = 20/1
Sample period — 0.5 hr.

Analyses of the total-gas samples were carried out on a Hewlett-Packard chromatograph (Model 7620A) using a 100-foot squalane column (.02 inches diameter), hydrogen carrier gas, inlet split and nitrogen make-up gas. Peak areas were obtained from the integration of a flame-ionization detector signal. Because the detector senses only carbon ions produced in the flame and because each carbon ion represents 1/4 molecule of thiophene reactant, a simple normalization of the peak areas gives the mole-fractions of thiophene converted to the individual products and affords a measure of the molar conversion of the thiophene.

Based on the conversion of thiophene at the temperatures of 550°, 600° and 650°F, the reaction constants, $K_1$, were as follows; using the product of Example I as the reference for the products of Examples II to V, and the product of Example VI as the reference for that of Example VII.

TABLE I

| Catalyst Example | Description | $k_1$ (unit volume) | | |
|---|---|---|---|---|
| | | 550°F. | 600°F. | 650°F. |
| | Control | 100 | 100 | 100 |
| 2 | DMSO impreg. of untreated base | 108 | 113 | 163 |
| 3 | DMSO impreg. of DMSO-treated base (2 hr. reflux) | 130 | 137 | |
| 4 | DMSO impreg. of DMSO-treated base (19 hr. reflux) | 124 | 123 | 186 |

TABLE I-continued

| Catalyst Example | Description | $k_1$ (unit volume) 550°F. | 600°F. | 650°F. |
|---|---|---|---|---|
| 5 | Hot DMSO impreg. of untreated base | 147 | 159 | 333 |

TABLE II

| catalyst Example | Description | Relative Rate Constants ($k_1$) 500°F. | | 600°F. | | 650°F. | |
|---|---|---|---|---|---|---|---|
| | | Unit Volume | Unit Weight | Unit Volume | Unit Weight | Unit Volume | Unit Weight |
| 6 | DMSO impreg. of untreated base | 100 | 100 | 100 | 100 | 100 | 100 |
| 7 | DMSO impreg. of base from DMSO-treated wet cake | 170 | 245 | 154 | 222 | 170 | 245 |

It may be seen from Table I that the relative rate constant to desulfurize thiophene increases with both reaction temperature and extent of DMSO impregnation. The maximum conversion rate is obtained at 650°F with hot DMSO impregnation of the alumina base. The conversion rate is over three times that of the control. It may be also concluded that this activation is also dependent on the temperature. At 550°F and 600°F, for example, the increase is 1.47 to 1.7 times greater. At 650°F the ratio increase is 3.33:1.

The DMSO impregnation route is shown superior in Table I to aqueous impregnation. However, in Table II, the "new" alumina itself may have an effect on the rate constant. DMSO treatment of the alumina wet-cake improves the rate constant even with respect to a DMSO-impregnated catalyst.

Having described our invention in both broad and narrow terms it is clear that this disclosure is susceptible to obvious modifications, these which are considered to be within the scope of the invention as hereinafter claimed.

We claim:

1. A hydrodesulfurization catalyst comprising at least one oxide of a metal selected from a Group VIB and a metal selected from Group VIII of the Periodic Table incorporated with a refractory base, said catalyst being prepared by impregnating the said base with a solution of a soluble compound of each of said metals in a non-aqueous polar solvent, drying said impregnated base and calcining the dried impregnated base.

2. The catalyst of claim 1 wherein the refractory base is selected from the group consisting of alumina, silica and aluminosilicates.

3. The catalyst of claim 1 wherein the base is alumina.

4. The catalyst of claim 1 wherein the soluble metal compound is a molybdenum compound.

5. The catalyst of claim 1 wherein the soluble metal compound is a cobalt compound.

6. The catalyst of claim 1 wherein said oxides are oxides of cobalt and molybdenum.

7. The catalyst of claim 1 wherein the solvent is dimethylsulfoxide.

8. The catalyst of claim 1 wherein during the preparation of said catalyst said base is sequentially impregnated with solutions of said metal compounds in dimethylsulfoxide.

9. The catalyst of claim 1 wherein the base is sequentially impregnated with solutions of a molybdenum compound in dimethylsulfoxide and compound in dimethylsulfoxide.

10. The catalyst of claim 1 wherein said base is prepared by precipitating said hydroxide of the base from an aqueous solution of a soluble salt thereof, refluxing the resulting precipitated hydroxide of said base with a non-aqueous polar solvent, drying said refluxed hydroxide of said base; and calcining the refluxed and dried hydroxide of said base.

11. A hydrodesulfurization catalyst comprising at least one metal oxide of a metal selected from the group consisting of Group VIB and Group VIII of the Periodic Table incorporated with a refractory base, said catalyst being prepared by refluxing the said base with dimethylsulfoxide, drying and calcining the refluxed base, impregnating the resulting calcined base with a solution of a soluble compound of said metal in a non-aqueous polar solvent, drying the impregnated base and calcining the dried impregnated base.

12. A hydrodesulfurization catalyst comprising a refractory base having incorporated therewith cobalt and molybdenum oxides by the steps of impregnating the said base sequentially with a dimethylsulfoxide solution of a soluble compound; of cobalt and a dimethylsulfoxide solution of a soluble compound of; molybdenum, drying said impregnated bases and calcining the dried impregnated base after each of said impregnating steps.

13. A hydrodesulfurization catalyst comprising at least one metal oxide the group consisting of a metal selected from Group VIB and Group VIII of the Periodic Table incorporated with alumina, said catalyst being prepared by first refluxing the alumina with the dimethylsulfoxide, drying and calcining said refluxed alumina impregnating the resulting dried, calcined alumina with a solution of a soluble compound of said metal in dimethylsulfoxide, then drying said impregnated alumina and calcining the dried impregnated alumina.

14. An alumina suitable for use as a base for metal-containing components in the preparation of catalysts prepared by the steps of Claim 10, comprising precipitating aluminum hydroxide from an aqueous solution of a soluble aluminum salt, filtering the precipitated aluminum hydroxide and refluxing said precipitated and filtered aluminum hydroxide; with a non-aqueous polar solvent, drying the refluxed alumina hydroxide; and calcining the refluxed and dried aluminum hydroxide.

15. The alumina of claim 14 wherein the non-aqueous solvent is dimethylsulfoxide.

\* \* \* \* \*

UNITED STATES PATENT AND TRADEMARK OFFICE
CERTIFICATE OF CORRECTION

PATENT NO. : 3,959,179
DATED : May 25, 1976
INVENTOR(S) : RICHARD J. MIKOVSKY AND ANTHONY J. SILVESTRI

It is certified that error appears in the above-identified patent and that said Letters Patent are hereby corrected as shown below:

| | |
|---|---|
| Column 1, line 21 | "2,886,750" should be --2,866,750-- |
| Column 6, Table I, line 63 | under the numeral "163" insert the numeral --248-- |
| Column 8, line 18 | "and compound" should be --and a cobalt compound-- |
| Column 8, line 43 | "bases" should be --base-- |
| Column 8, line 47 | "one metal oxide the group consisting of a metal selected from" should be --one metal oxide of a metal selected from the group consisting of-- |
| Column 8, line 50-51 | "the dimethylsulfoxide" should be --dimethylsulfoxide-- |

Signed and Sealed this

Twenty-second Day of February 1977

[SEAL]

Attest:

RUTH C. MASON
*Attesting Officer*

C. MARSHALL DANN
*Commissioner of Patents and Trademarks*